United States Patent
Joe

(10) Patent No.: US 12,158,206 B2
(45) Date of Patent: Dec. 3, 2024

(54) SPRING STRUCTURE FOR MECHANICAL OIL PUMP

(71) Applicant: BorgWarner Inc., Auburn Hills, MI (US)

(72) Inventor: KyungChul Joe, Gyeonggi-do (KR)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/713,468

(22) PCT Filed: Nov. 30, 2021

(86) PCT No.: PCT/US2021/061199
§ 371 (c)(1),
(2) Date: May 24, 2024

(87) PCT Pub. No.: WO2023/101657
PCT Pub. Date: Jun. 8, 2023

(65) Prior Publication Data
US 2024/0328485 A1 Oct. 3, 2024

(51) Int. Cl.
*F16H 7/08* (2006.01)
*F01M 1/02* (2006.01)

(52) U.S. Cl.
CPC .................. *F16H 7/08* (2013.01); *F01M 1/02* (2013.01); *F01M 2001/0269* (2013.01);
(Continued)

(58) Field of Classification Search
CPC ....... F16H 2007/081; F16H 2007/0872; F16H 2007/0893; F16H 2007/0897; F16H 7/08
(Continued)

(56) References Cited

U.S. PATENT DOCUMENTS 3,148,555 A * 9/1964 Peras ........................ F16H 7/08
474/111
3,673,884 A * 7/1972 Southiere ............... B62D 55/07
474/111
(Continued)

FOREIGN PATENT DOCUMENTS

CN 203297440 U 11/2013
JP 2012036996 A 2/2012
(Continued)

OTHER PUBLICATIONS

International Search Report for PCT/US2021/061199 dated Aug. 12, 2022.

*Primary Examiner* — Henry Y Liu
(74) *Attorney, Agent, or Firm* — Brown & Michaels, PC

(57) ABSTRACT

A torsion spring for an oil pump chain tensioner for use in an engine. The torsion spring has: a second end; a leg connected to the second end through a hook bend; an outer coil connected to the leg having an outer coil outer circumference and an outer coil inner circumference; a first inner coil connected to the outer coil, the first inner coil having a first inner coil outer circumference and a first inner coil inner circumference, the outer coil inner circumference being adjacent to the first inner coil outer circumference; and a second inner c-shaped coil connected to the first inner coil through a bend back loop, the second inner coil having a second inner coil outer circumference and a second inner coil inner coil circumference and terminating in a first end, where the second inner coil outer circumference and the first coil inner circumference define a gap.

15 Claims, 11 Drawing Sheets

(52) U.S. Cl.
CPC .............. *F16H 2007/081* (2013.01); *F16H 2007/0872* (2013.01); *F16H 2007/0893* (2013.01); *F16H 2007/0897* (2013.01)

(58) Field of Classification Search
USPC ...................................................... 474/111
See application file for complete search history.

(56) References Cited

U.S. PATENT DOCUMENTS

| | | | | |
|---|---|---|---|---|
| 4,976,659 | A * | 12/1990 | Hans ................. | F16H 7/0834 474/111 |
| 6,428,435 | B1 * | 8/2002 | Kumakura ............. | F16H 7/08 474/140 |
| 7,540,817 | B2 * | 6/2009 | Hashimoto ........... | F16H 7/0848 192/81 C |
| 8,083,623 | B2 * | 12/2011 | Cantatore ............. | F16H 7/18 474/111 |
| 8,092,327 | B2 * | 1/2012 | Kobara ................ | F16H 7/08 474/111 |
| 9,772,008 | B2 * | 9/2017 | Noro ................... | F16H 7/08 |
| 10,156,285 | B2 * | 12/2018 | Von Vopelius-Feldt ............. | F16H 7/08 |
| 10,408,312 | B2 * | 9/2019 | Noro ................... | F16H 7/08 |
| 11,371,591 | B2 * | 6/2022 | Muratsubaki .......... | F16H 7/06 |
| 11,434,980 | B2 * | 9/2022 | Watanabe ............. | F16H 7/08 |
| 11,732,784 | B2 * | 8/2023 | Noro ................... | F16H 7/08 474/111 |
| 2005/0143207 | A1 * | 6/2005 | Hashimoto ........... | F16H 7/0848 474/119 |
| 2009/0105022 | A1 * | 4/2009 | Cantatore ............. | F16H 7/08 474/111 |
| 2009/0111629 | A1 * | 4/2009 | Kobara ................ | F02B 67/06 474/111 |
| 2013/0085027 | A1 | 4/2013 | Meckstroth | |
| 2016/0102738 | A1 * | 4/2016 | Von Vopelius-Feldt ............. | F16H 7/08 474/111 |
| 2016/0252166 | A1 * | 9/2016 | Noro ................... | F16H 7/08 474/111 |
| 2017/0184183 | A1 * | 6/2017 | Noro ................... | F16H 7/08 |
| 2021/0131531 | A1 * | 5/2021 | Muratsubaki .......... | F16H 7/06 |
| 2021/0156456 | A1 * | 5/2021 | Watanabe ............. | F16H 7/08 |
| 2021/0262552 | A1 * | 8/2021 | Seki .................... | F16H 7/08 |
| 2021/0356022 | A1 * | 11/2021 | Muratsubaki .......... | F16H 7/08 |

FOREIGN PATENT DOCUMENTS

| | | |
|---|---|---|
| KR | 1020120097788 A | 9/2012 |
| WO | 2016028730 A1 | 2/2016 |

* cited by examiner

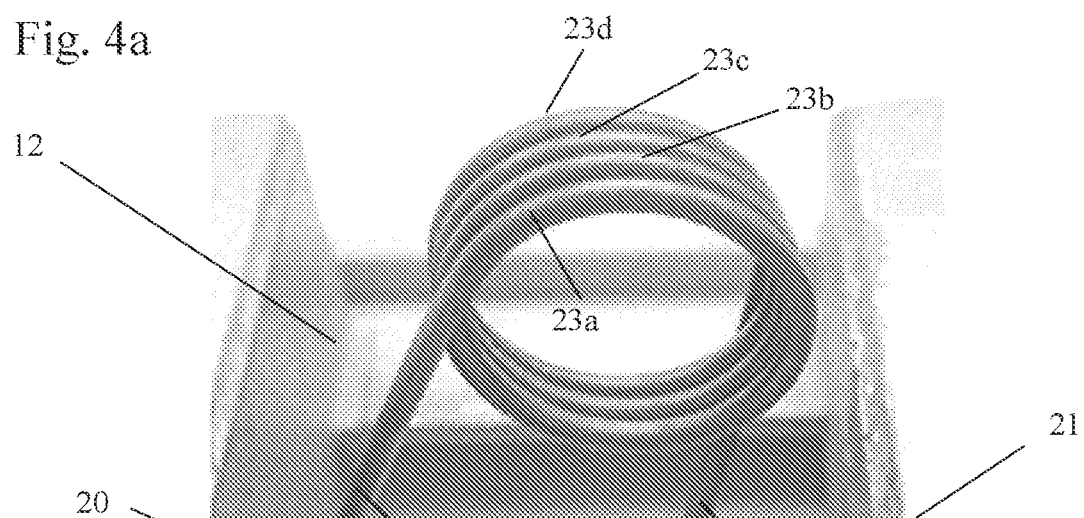
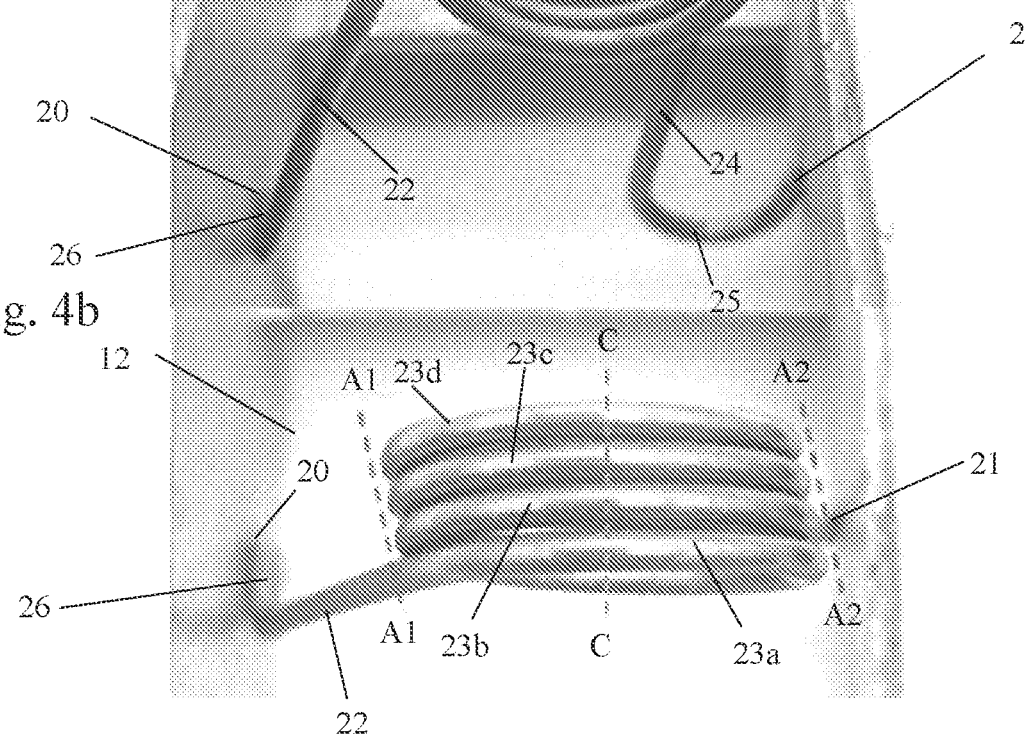

SPRING STRUCTURE FOR MECHANICAL OIL PUMP

BACKGROUND

The present invention relates to mechanical oil pumps, and more specifically to a spring structure for a mechanical oil pump.

An oil pump chain system in a timing chain drive of an engine uses a chain to transfer power from the crankshaft of the engine to a camshaft to drive the oil pump. An oil pump chain tensioner adjusts the chain tension of a slack span of the chain of the oil pump chain system. A torsion spring is set between the oil pump tensioner and the engine block and utilizes mechanical energy from the torsion spring elastic force via twisting to provide tension to the chain via the oil pump chain tensioner. The torsion spring exerts torque in proportion to the torsion spring angle.

FIG. 1 shows a conventional oil pump chain system 1 with a conventional torsion spring 12. The oil pump chain system 1 has a crankshaft oil pump drive sprocket 2 driven by a crankshaft 17 of the engine and an oil pump driven sprocket 4 driven by a camshaft 18 of the engine. A toothed chain 6 connects and engages the teeth 2a of the crankshaft oil pump drive sprocket 2 to the oil pump driven sprocket 4 via teeth 4a. Between the crankshaft oil pump drive sprocket 2 and the oil pump driven sprocket 4 is a tight chain span 6a and a slack chain span 6b. Adjacent to the slack chain span 6b is an oil pump chain tensioner 8.

The oil pump chain tensioner 8 has a body 9 with a tension sliding face 8a and an extending arm 8b defining a hole 11. The oil pump chain tensioner 8 is connected to an engine block 14 via a bolt 10 received within the hole 11 of the extending arm 8b of the body 9 of the oil pump chain tensioner 8. Between the extending arm 8b and the engine block 14 is a torsion spring 12.

FIGS. 2-4b show a conventional torsion spring 12 used with the oil pump chain tensioner 8. The torsion spring 12 has a first end 20, a second end 21 and a series of close wound coils 23a-23d between the first end 20 and the second end 21. Between the first end 20 and a first leg 22 is a 90 degree bend 26 and between the second end 21 and a second leg 24 is a round hook 25. The first leg 22 is integrally formed with the first end 20 and a first coil 23a. The second leg 24 is integrally formed with the second end 21 and a fourth coil 23d. The fourth coil 23d is connected to the first coil 23a through a second coil 23b and a third coil 23c. The first leg 22 is 270 degrees from the second leg 24.

Referring back to FIG. 1, in the oil pump chain system 1, the round hook 25 is wrapped around a protrusion 16 of the engine block 14 and the first end 20 and coils 23a-23d are wrapped around the bolt 10. FIGS. 3a and 3b show the torsion spring 12 in a free load state in which no load is present on either the first end 20 or the second end 21 of the torsion spring 12. It is noted that in the free state, a center axis C-C of the coils 23a-23d and axis A1-A1 and axis A2-A2 on the outer diameter of the coils 23a-23d are parallel to each other.

FIGS. 4a and 4b show the torsion spring 12 under tension. With the torsion spring 12 under tension with load applied to the first end 20 and the second end 21, a rotational torque is applied to the coils 23a-23d that causes the coils 23a-23d to twist or torque such that the axis A1-A1 and axis A2-A2 on the outer diameter of the coils 23a-23d are no longer parallel to the center axis C-C of the coils 23a-23d. The twisting or torquing of the coils 23a-23d twist or torque under load through a rotational or torsion angle, the path tension applied by the torsion spring 12 on the body 9 of the oil pump chain tensioner 8 is eccentric and not uniform and causes the tension sliding face 8a to shift, such that the chain path 26 of the slack chain span on the tension sliding face 8a is misaligned as indicated by dashed lines P1-P1 and P2-P2.

SUMMARY

According to one embodiment of the present invention, a spring improves oil pump tensioner eccentric load.

An oil pump chain tensioner for an oil pump chain tensioner system for use in an engine is disclosed. The oil pump chain tensioner comprises: a tensioner body and a torsion spring for tensioning the tensioner body towards a chain. The tensioner body comprises: a chain tensioning sliding face; an extending arm opposite the chain tensioning sliding face; a boss protruding from the extending arm defining a bore; a c-shaped collar concentric to an outer circumference of the boss having a first end and a second end; and a collar gap defined between the outer circumference of the boss and an inner circumference of the c-shaped collar. The torsion spring comprises: a second end; a leg connected to the second end through a hook bend; an outer coil connected to the leg having an outer coil outer circumference and an outer coil inner circumference; a first inner coil connected to the outer coil, the first inner coil having a first inner coil outer circumference and a first inner coil inner circumference, the outer coil inner circumference being adjacent to the first inner coil outer circumference; and a second inner c-shaped coil connected to the first inner coil through a bend back loop, the second inner coil having a second inner coil outer circumference and a second inner coil inner coil circumference and terminating in a first end, wherein the second inner coil outer circumference and the first coil inner circumference define a gap. The torsion spring is mounted to the tensioner body such that the first inner coil inner circumference is adjacent the outer circumference of the c-shaped collar, the inner circumference of the c-shaped collar is adjacent the second inner coil outer circumference, the second inner coil inner circumference is adjacent the outer circumference of the c-shaped collar, with the c-shaped collar being present within the gap defined between the second inner coil outer circumference and the first coil inner circumference and the bend back loop is present in the collar gap.

A torsion spring for an oil pump chain tensioner for use in an engine is disclosed. The torsion spring comprises: a second end; a leg connected to the second end through a hook bend; an outer coil connected to the leg having an outer coil outer circumference and an outer coil inner circumference; a first inner coil connected to the outer coil, the first inner coil having a first inner coil outer circumference and a first inner coil inner circumference, the outer coil inner circumference being adjacent to the first inner coil outer circumference; and a second inner c-shaped coil connected to the first inner coil through a bend back loop, the second inner coil having a second inner coil outer circumference and a second inner coil inner coil circumference and terminating in a first end, wherein the second inner coil outer circumference and the first coil inner circumference define a gap.

An oil pump chain tensioner system for use in an engine having a camshaft and a crankshaft is disclosed. The oil pump chain tensioner comprises: a crankshaft oil pump drive sprocket; a camshaft oil pump driven sprocket; a chain, a tensioner body, and a torsion spring. The chain connects the crankshaft oil pump drive sprocket to the camshaft oil pump driven sprocket so that rotation of the crankshaft oil pump drive sprocket rotates the camshaft oil pump driven sprocket. The chain has a slack strand and a tight strand between the crankshaft oil pump drive sprocket to the camshaft oil pump driven sprocket. The tensioner body comprises: a chain tensioning sliding face in contact with the slack strand of the chain; an extending arm opposite the chain tensioning sliding face; a boss protruding from the extending arm defining a bore; a c-shaped collar concentric to an outer circumference of the boss having a first end and a second end; a collar gap defined between the outer circumference of the boss and an inner circumference of the c-shaped collar. The torsion spring exerts force on the tensioner body to provide tension to the slack stand of the chain via the chain tensioning sliding face. The torsion spring comprises: a second end; a leg connected to the second end through a hook bend; an outer coil connected to the leg having an outer coil outer circumference and an outer coil inner circumference; a first inner coil connected to the outer coil, the first inner coil having a first inner coil outer circumference and a first inner coil inner circumference, the outer coil inner circumference being adjacent to the first inner coil outer circumference; and a second inner c-shaped coil connected to the first inner coil through a bend back loop, the second inner coil having a second inner coil outer circumference and a second inner coil inner coil circumference and terminating in a first end, wherein the second inner coil outer circumference and the first coil inner circumference define a gap. The torsion spring is mounted to the tensioner body such that the first inner coil inner circumference is adjacent the outer circumference of the c-shaped collar, the inner circumference of the c-shaped collar is adjacent the second inner coil outer circumference, the second inner coil inner circumference is adjacent the outer circumference of the c-shaped collar, with the c-shaped collar being present within the gap defined between the second inner coil outer circumference and the first coil inner circumference and the bend back loop is present in the collar gap.

BRIEF DESCRIPTION OF THE DRAWINGS

FIG. 4a shows a perspective view of the conventional torsion spring in a twisting state.

FIG. 4b shows a top view of the conventional torsion spring in a twisting state.

DETAILED DESCRIPTION

Figure 1:
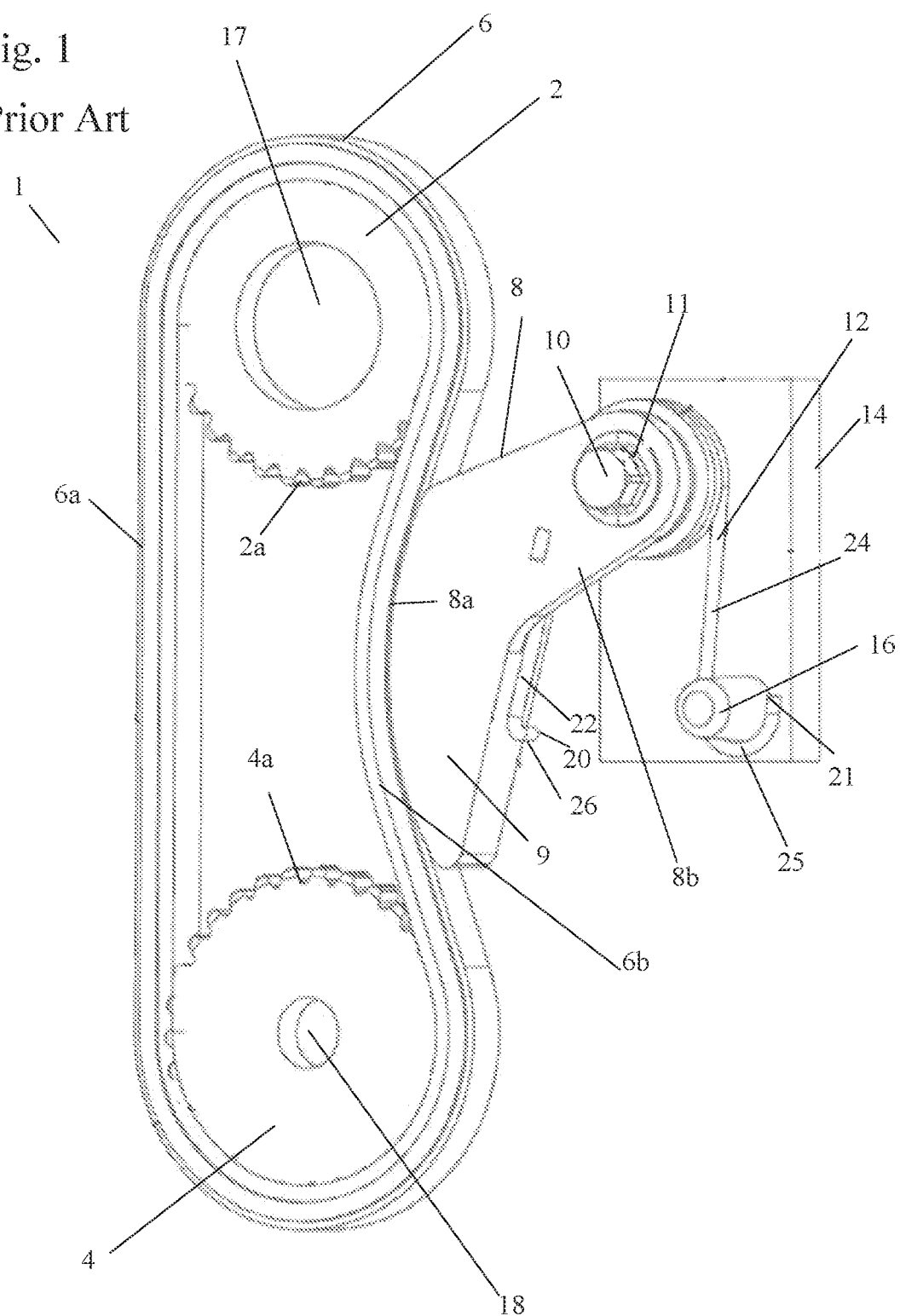
FIG. 1 shows an oil pump chain system with a conventional torsion spring.
Figure 2:
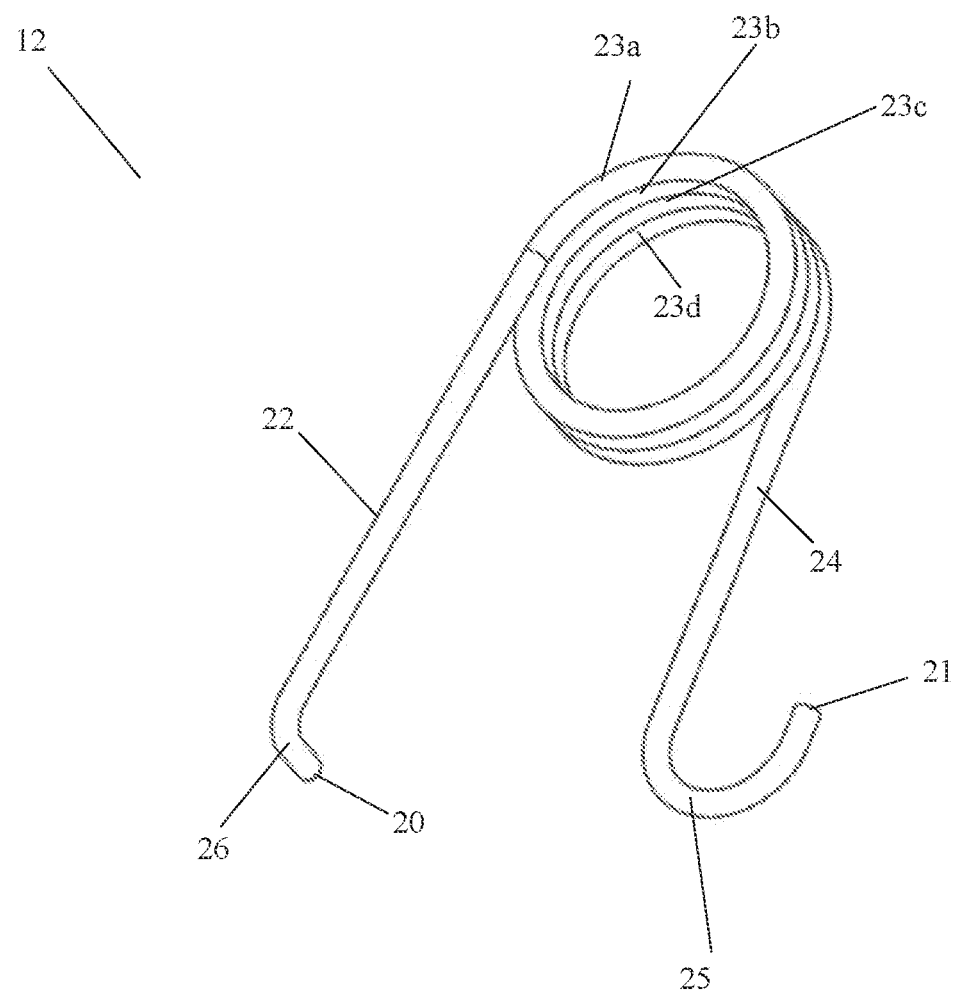
FIG. 2 shows a conventional torsion spring for use with the conventional oil pump chain system of FIG. 1.
Figure 3A:
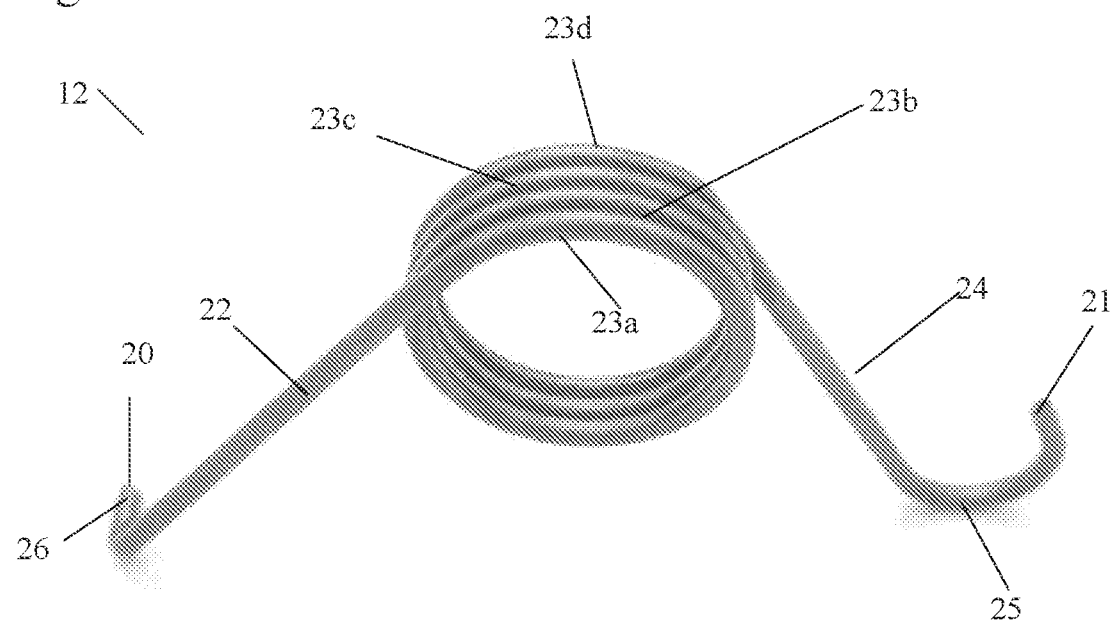
FIG. 3a shows perspective view of a conventional torsion spring in a free load state.
Figure 3B:
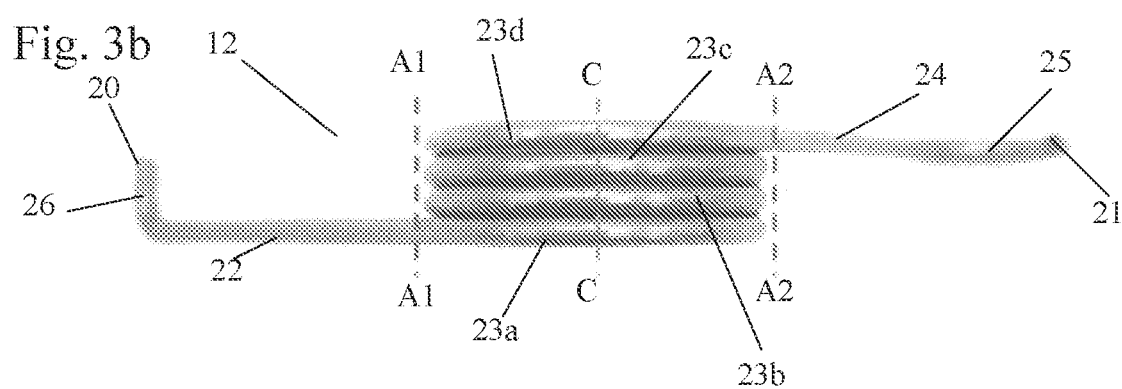
FIG. 3b shows a top view of the conventional torsion spring in the free load state.
Figure 5:
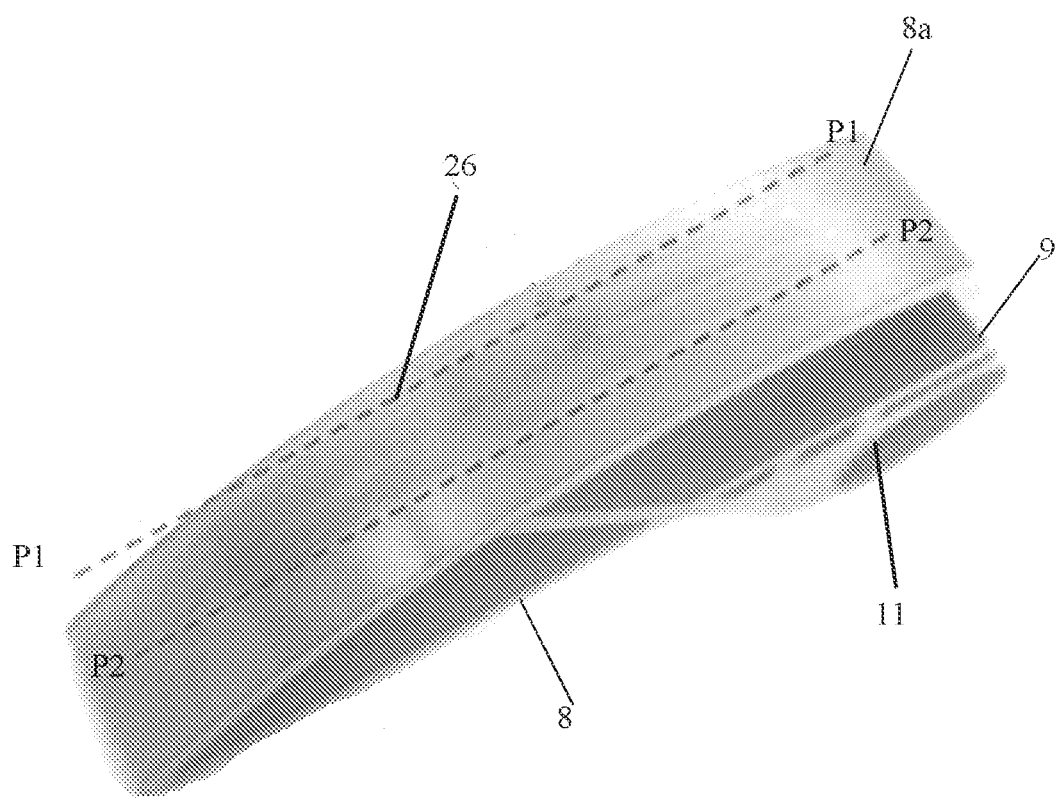
FIG. 5 shows the tensioner misalignment from the conventional torsion spring of the oil pump chain system.
Figure 6:
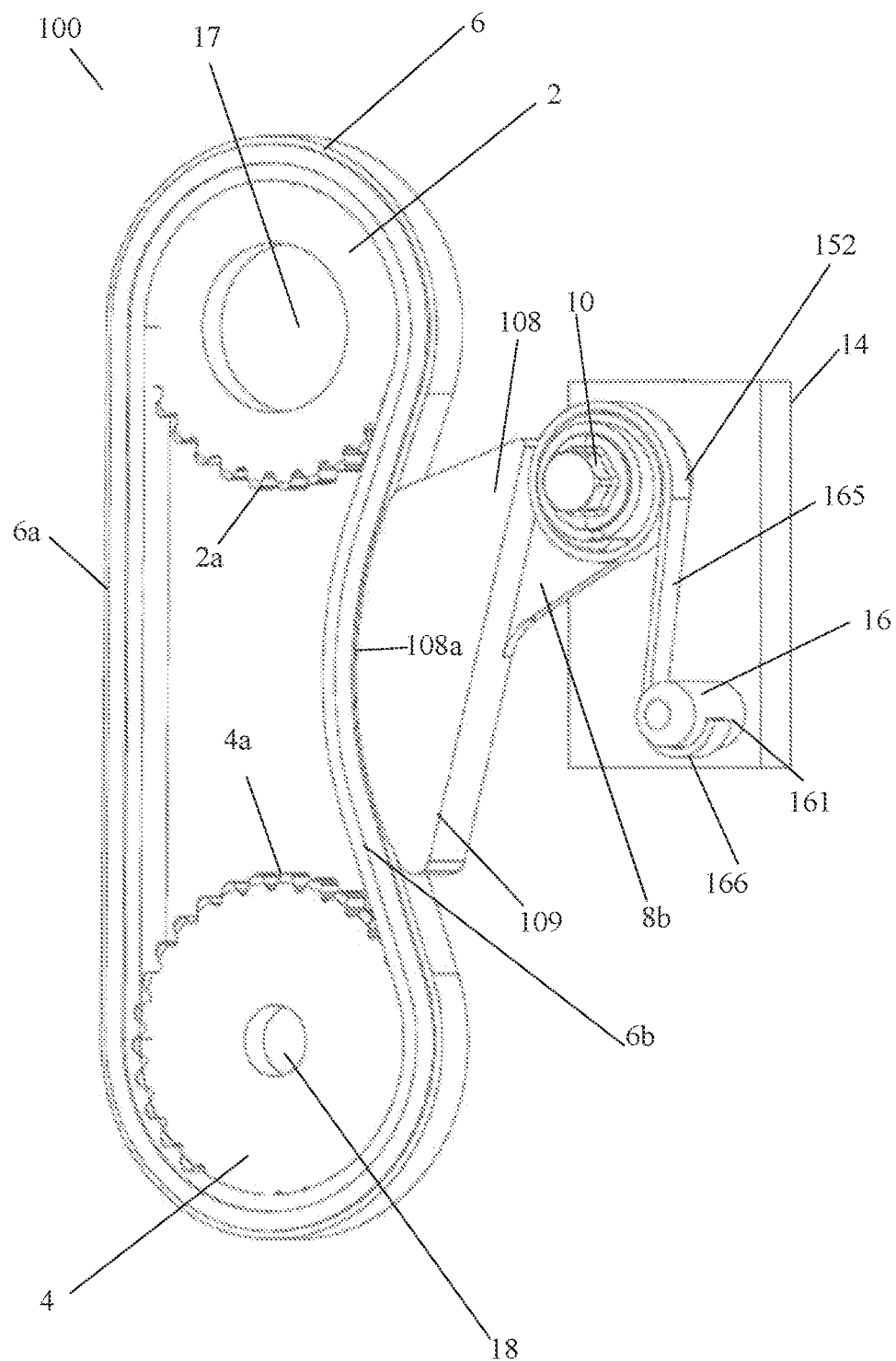
FIG. 6 shows an oil pump chain system with a spring structure of an embodiment of the present invention.

FIG. 6 shows an oil pump chain system 100 of an embodiment of the present invention. The oil pump chain system 100 has a crankshaft oil pump drive sprocket 2 driven by a crankshaft 17 of the engine and an oil pump driven sprocket 4 driven by a camshaft 18 of the engine. A toothed chain 6 connects and engages the teeth 2a of the crankshaft oil pump drive sprocket 2 to the oil pump driven sprocket 4 via teeth 4a. Between the crankshaft oil pump drive sprocket 2 and the oil pump driven sprocket 4 is a tight chain span 6a and a slack chain span 6b. Adjacent to the slack chain span 6b is an oil pump chain tensioner 108.

Figure 9:
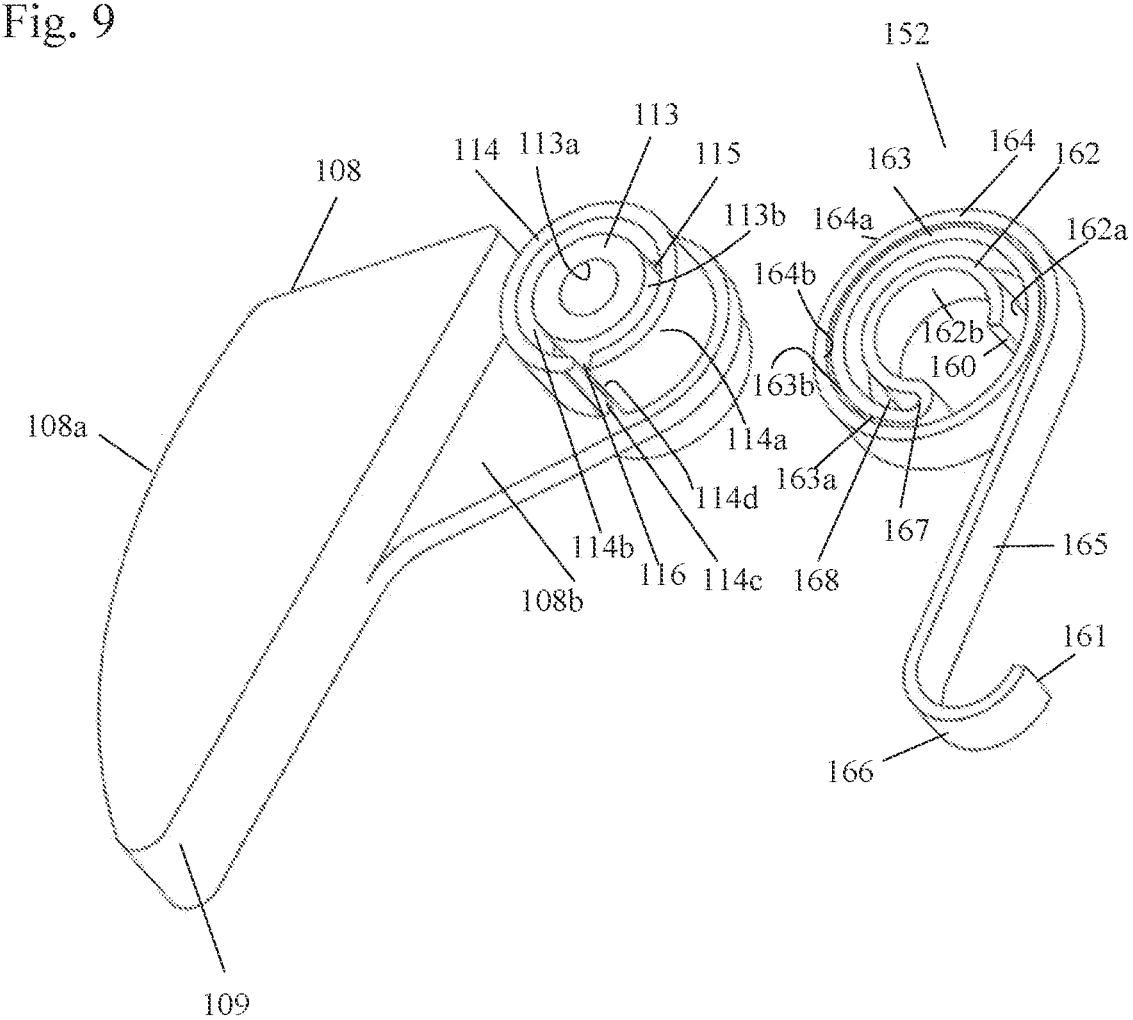
FIG. 9 shows an oil pump chain tensioner of an embodiment of the present invention with the receiver for the spring structure of an embedment of the present invention.
Figure 10:
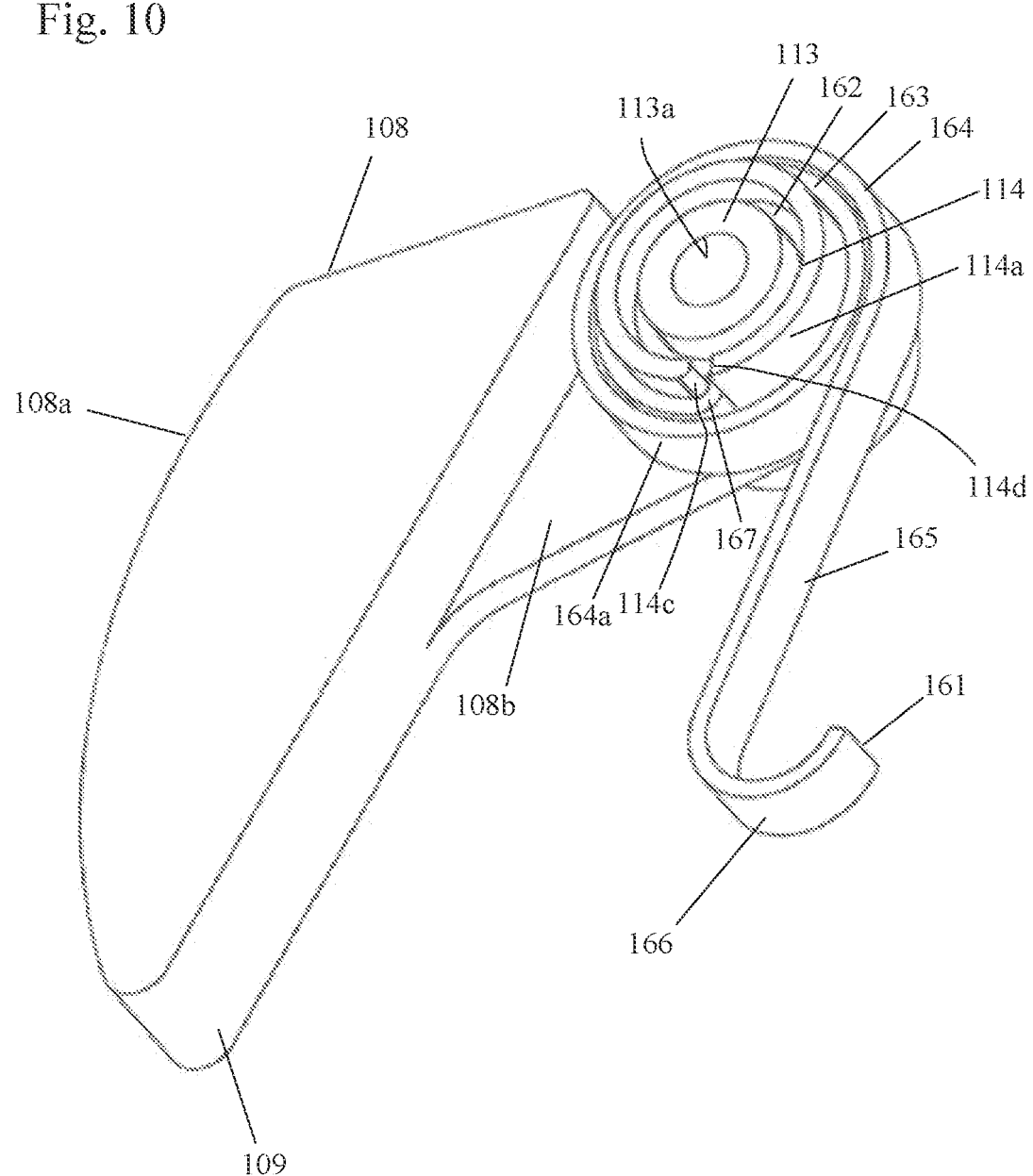
FIG. 10 shows an oil pump chain tensioner of an embodiment of the present invention with the receiver receiving the spring structure of an embedment of the present invention.
Figure 11:
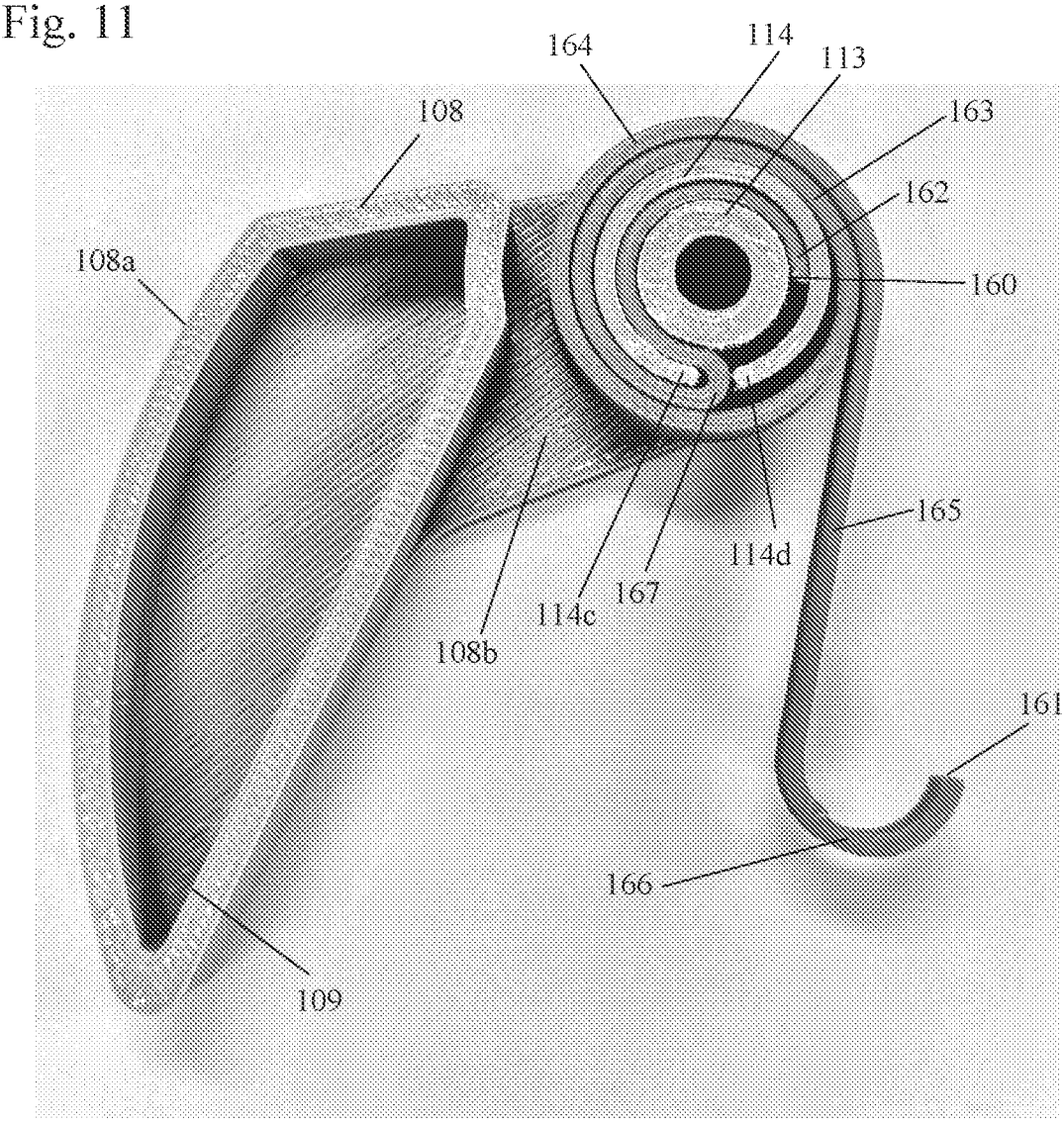
FIG. 11 shows a sectional view of the oil pump chain tensioner of an embodiment of the present invention with the receiver receiving the spring structure of an embedment of the present invention.

Referring to FIGS. 9-11, the oil pump chain tensioner 108 has a body 109 with a tension sliding face 108a and an extending arm 108b having a protruding boss 113 which defines a bore 113a. The protruding boss 113 is perpendicular to the tension sliding face 108a. The tension sliding face 108a is opposite from the extending arm 108b. Concentric to an outer circumference 113b of the protruding boss 113 is a c-shaped collar 114 with an outer circumference 114a, an inner circumference 114b, a first end 114c and a second end 114d. A collar gap 116 is present between the first end 114c and the second end 114d. The inner circumference 114b of the c-shaped collar 114 and the outer circumference 113b of the protruding boss 113 define a concentric gap 115.

The oil pump chain tensioner 108 is connected to an engine block 14 via a bolt 10 which is received within the bore 113a of the protruding boss 113 of the extending arm 108b of the body 109 of the oil pump chain tensioner 108. The engine block 14 has a boss 16. Between the extending arm 8b and the engine block 14 is a torsion spring 152 of an embodiment of the present invention.

As shown in FIGS. 7-10, the spiral torsion spring 152 has a first end 160, a second end 161, and concentric, spiral coils 162, 163, 164. The torsion spring 152 is preferably made of flat steel. The torsion spring 152 is spiral wound where the coils 162-164 are coiled around each other and the coils are not piled on top of each other as in the prior art torsion spring 12. Due to the shape of the flat steel, the spring 152 can exert a rotational torque but does not have an eccentric load. The second end 161 has hook bend 166 which is integrally formed with a leg 165. The leg 165 is integrally formed with an outer coil 164 having an inner circumference 164b and an outer circumference 164a. The outer coil 164 is connected to and integrally formed with a first inner coil 163 having an inner circumference 163b and an outer circumference 163a. The first inner coil 163 is connected to a second inner c-shaped coil 162 through a bend back loop 167. The second inner c-shaped coil 162 has an inner circumference 162b and an outer circumference 162a. The second inner c-shaped coil 162 terminates in the first end 160. The inner circumference 164b of the outer coil 164 is concentric and adjacent to the outer circumference 163a of the first inner coil 163. At least a portion of the inner circumference 163a of the first inner coil 163 is concentric to the outer circumference 162a of the second inner c-shaped coil 162 with a coil gap 168 between the inner circumference 163a of the first inner coil 163 and the outer circumference 162a of the second inner c-shaped coil 162. The width of the coil gap 168 is defined by the amount of the back bend loop 167 and further determined by the diameter of the bolt 10. The radius associated with the back bend loop 167 is determined by a minimum radius that can be manufactured based on the thickness of the flat steel.

The protruding boss 113 and c-shaped collar 114 of the extending arm 108b receives the torsion spring 152. More specifically, the outer circumference 113b of the protruding boss 113 and the inner circumference 114b of the c-shaped collar 114 defines a concentric gap 115 which receives an inner circumference 162b of the second inner c-shaped soil 162 of the torsion spring 152. The bend back loop 167 of the torsion spring 152 is present between the first end 114c and the second end 114d of the C-shaped collar 114 within the collar gap 116. The inner circumference 163b is adjacent to the outer circumference 114a of the C-shaped collar 114. It is noted that a small amount of rotation play is available between the first end 114c of the C-shaped collar and the bend back loop 167 and defined coil gap 168. The round hook 166 is wrapped around the protrusion 16 of the engine block 14.

Figure 7:
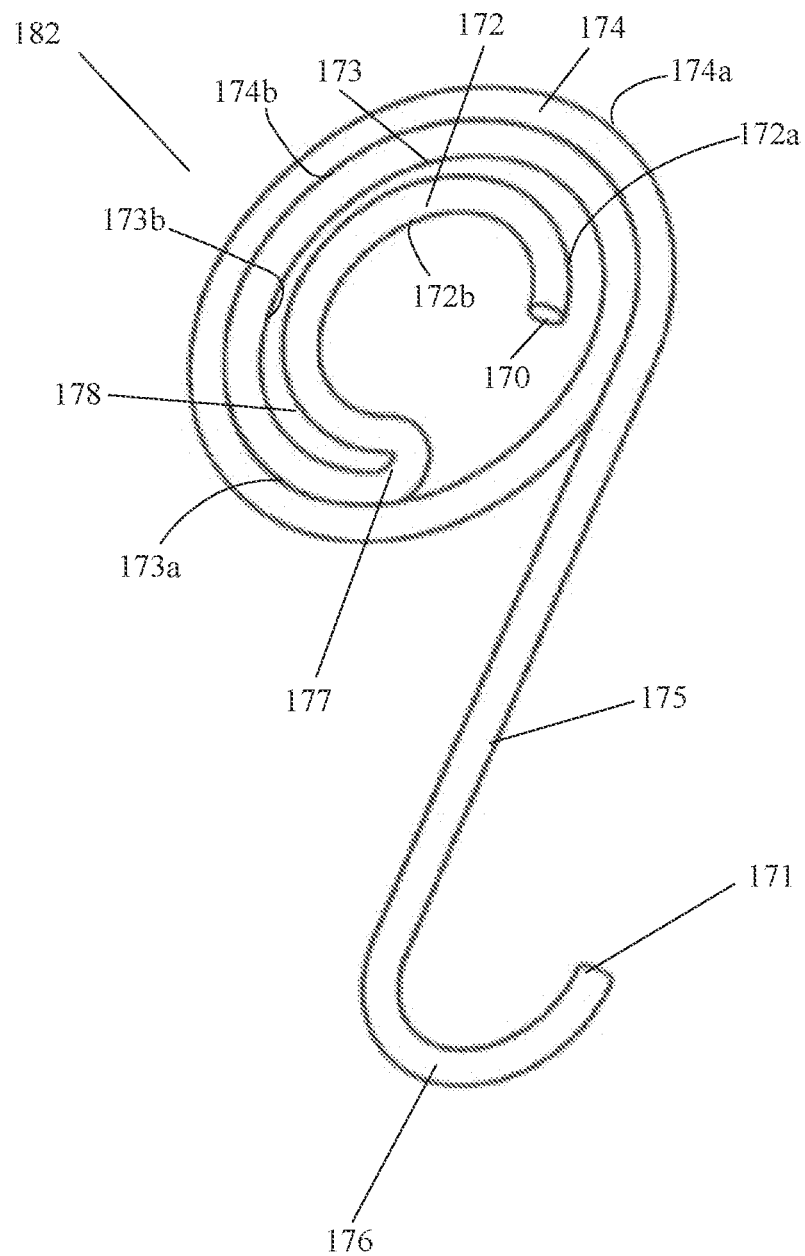
FIG. 7 shows a coil spring structure of an embodiment of the present invention.
Figure 8:
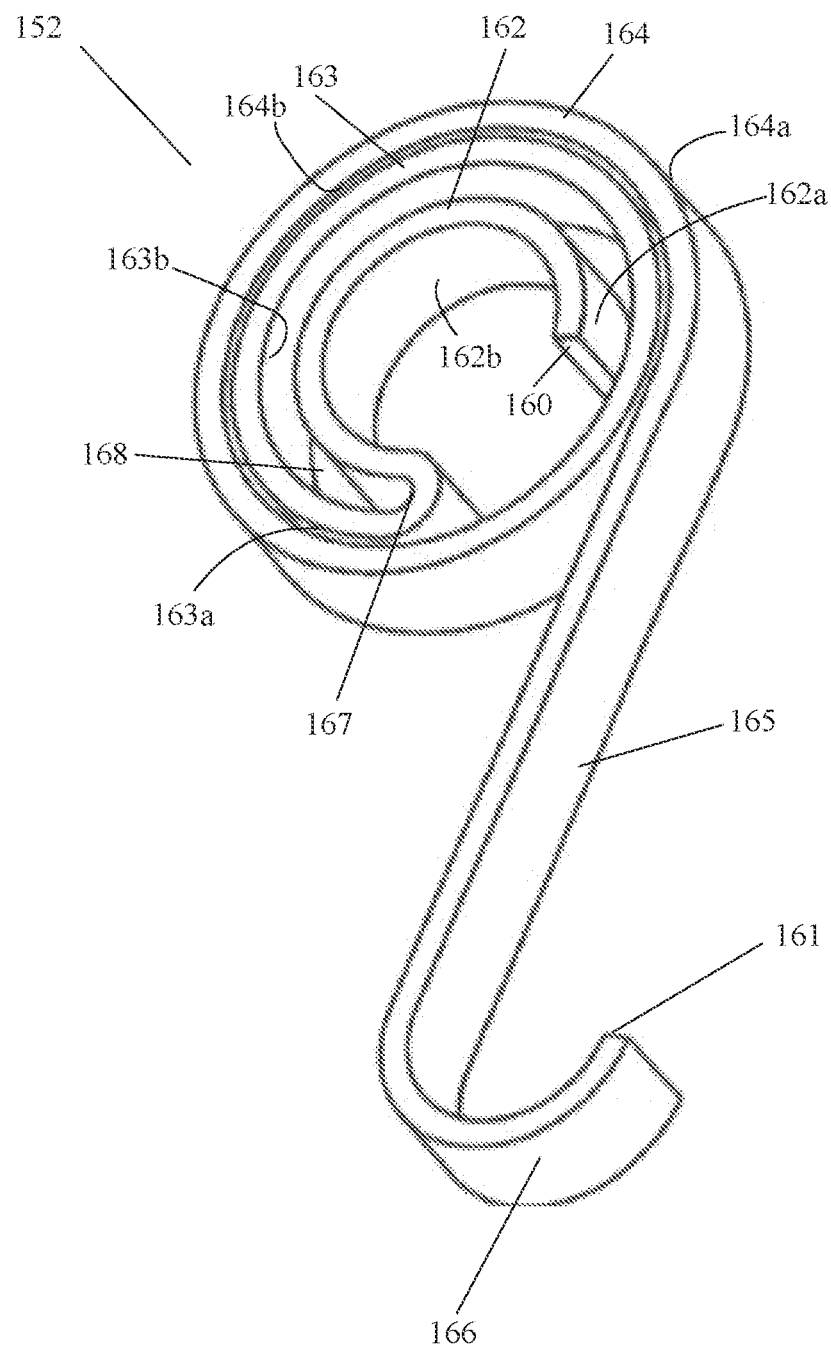
FIG. 8 shows a flat steel spring structure of an alternate embodiment of the present invention.

Alternatively, the spring of the oil pump tensioner can be made of a rounded wire as shown in FIG. 7. The rounded wire torsion spring 182 has a first end 170, a second end 171, and concentric coils 172, 173, 174. Due to the shape of the rounded wire torsion spring 182, the spring can exert a rotational torque but does not have an eccentric load. The torsion spring 182 is spiral wound where the coils 172-174 are coiled around each other and the coils are not piled on top of each other as in the prior art torsion spring 12. The second end 171 has hook bend 176 which is integrally formed with a leg 175. The leg 175 is integrally formed with an outer coil 174 having an inner circumference 174b and an outer circumference 174a. The outer coil 174 is connected to and integrally formed with a first inner coil 173 having an inner circumference 173b and an outer circumference 173a. The first inner coil 173 is connected to a second inner c-shaped coil 172 through a bend back loop 177. The second inner c-shaped coil 172 has an inner circumference 172b and an outer circumference 172a. The second inner c-shaped coil 172 terminates in the first end 170. The inner circumference 174b of the outer coil 174 is concentric and adjacent to the outer circumference 173a of the first inner coil 173. At least a portion of the inner circumference 173a of the first inner coil 173 is concentric to the outer circumference 172a of the second inner c-shaped coil 172 with a coil gap 178 between the inner circumference 173a of the first inner coil 173 and the outer circumference 172a of the second inner c-shaped coil 172. The width of the coil gap 178 is defined by the amount of the back bend loop 177 and further determined by the diameter of the bolt 10. The radius associated with the back bend loop 167 is determined by a minimum radius that can be manufactured based on the thickness of the coil.

The rounded wire torsion spring 182 is received by the protruding boss 113 and c-shaped collar 114 of the extending arm 108b. More specifically, the outer circumference 113b of the protruding boss 113 and the inner circumference 114b of the c-shaped collar 114 defines a concentric gap 115 which receives an inner circumference 162b of the second inner c-shaped soil 172 of the rounded coil spring 182. The bend back loop 177 of the rounded coil spring 182 is present between the first end 114c and the second end 114d of the C-shaped collar 114 within the collar gap 116. The inner circumference 173b is adjacent to the outer circumference 114a of the C-shaped collar 114. It is noted that a small amount of rotation play is available between the first end 114c of the C-shaped collar 114 and the bend back loop 177 and defined coil gap 178. The round hook 176 is wrapped around the protrusion 16 of the engine block 14.

The diameter of the rounded wire or the thickness of the flat steel of the torsion spring can vary as well as the number of concentric coils. The outer diameter of the coil and the thickness of the flat steel of the torsion spring can be increased or decreased based on the spring torque required by the tensioner.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An oil pump chain tensioner for an oil pump chain tensioner system comprising:
    a tensioner body comprising:
        a chain tensioning sliding face;
        an extending arm opposite the chain tensioning sliding face;
        a boss protruding from the extending arm defining a bore;
        a c-shaped collar concentric to an outer circumference of the boss having a first end and a second end defining a collar gap;
        a concentric gap defined between the outer circumference of the boss and an inner circumference of the c-shaped collar; and
    a torsion spring comprising:
        a second end;
        a leg connected to the second end through a hook bend;
        an outer coil connected to the leg having an outer coil outer circumference and an outer coil inner circumference;
        a first inner coil connected to the outer coil, the first inner coil having a first inner coil outer circumference and a first inner coil inner circumference, the outer coil inner circumference being adjacent to the first inner coil outer circumference;
        a second inner c-shaped coil connected to the first inner coil through a bend back loop, the second inner coil having a second inner coil outer circumference and a second inner coil inner circumference and terminating in a first end, wherein the second inner coil outer circumference and the first inner coil inner circumference define a coil gap;
    wherein the torsion spring is mounted to the tensioner body such that the first inner coil inner circumference is adjacent the outer circumference of the c-shaped collar, the inner circumference of the c-shaped collar is adjacent the second inner coil outer circumference with the second inner coil being present in the concentric gap, the second inner coil inner circumference is adjacent the outer circumference of the c-shaped collar, with the c-shaped collar being present within the coil gap defined between the second inner coil outer circumference and the first inner coil inner circumference and the bend back loop being present in the collar gap.

2. The oil pump chain tensioner of claim 1, wherein the boss is perpendicular to the chain tensioning sliding face.

3. The oil pump chain tensioner of claim 1, wherein the torsion spring is made of flat steel.

4. The oil pump chain tensioner of claim 1, wherein the torsion spring is made of rounded coil.

5. The oil pump chain tensioner of claim 1, wherein the second inner c-shaped coil is concentric to the first inner coil and the first inner coil is concentric to the outer coil.

6. A torsion spring for an oil pump chain tensioner comprising:
   a second end;
   a leg connected to the second end through a hook bend;
   an outer coil connected to the leg having an outer coil outer circumference and an outer coil inner circumference;
   a first inner coil connected to the outer coil, the first inner coil having a first inner coil outer circumference and a first inner coil inner circumference, the outer coil inner circumference being adjacent to the first inner coil outer circumference; and
   a second inner c-shaped coil connected to the first inner coil through a bend back loop, the second inner coil having a second inner coil outer circumference and a second inner coil inner circumference and terminating in a first end, wherein the second inner coil outer circumference and the first inner coil inner circumference define a coil gap.

7. The torsion spring of claim 6, wherein the torsion spring is made of flat steel.

8. The torsion spring of claim 6, wherein the torsion spring is made of rounded coil.

9. The torsion spring of claim 6, wherein the second inner c-shaped coil is concentric to the first inner coil and the first inner coil is concentric to the outer coil.

10. An oil pump chain tensioner system comprising
    a crankshaft oil pump drive sprocket;
    a camshaft oil pump driven sprocket;
    a chain connecting the crankshaft oil pump drive sprocket to the camshaft oil pump driven sprocket, the chain having a slack strand and a tight strand between the crankshaft oil pump drive sprocket to the camshaft oil pump driven sprocket;
    a tensioner body comprising:
        a chain tensioning sliding face in contact with the slack strand of the chain;
        an extending arm opposite the chain tensioning sliding face;
        a boss protruding from the extending arm defining a bore;
        a c-shaped collar concentric to an outer circumference of the boss having a first end and a second end defining a collar gap;
        a concentric gap defined between the outer circumference of the boss and an inner circumference of the c-shaped collar; and
    a torsion spring for exerting force on the tensioner body to provide tension to the slack stand of the chain via the chain tensioning sliding face, the torsion spring comprising:
        a second end;
        a leg connected to the second end through a hook bend;
        an outer coil connected to the leg having an outer coil outer circumference and an outer coil inner circumference;
        a first inner coil connected to the outer coil, the first inner coil having a first inner coil outer circumference and a first inner coil inner circumference, the outer coil inner circumference being adjacent to the first inner coil outer circumference; and
        a second inner c-shaped coil connected to the first inner coil through a bend back loop, the second inner coil having a second inner coil outer circumference and a second inner coil inner circumference and terminating in a first end, wherein the second inner coil outer circumference and the first inner coil inner circumference define a coil gap;
    wherein the torsion spring is mounted to the tensioner body such that the first inner coil inner circumference is adjacent the outer circumference of the c-shaped collar, the inner circumference of the c-shaped collar is adjacent the second inner coil outer circumference with the second inner coil being present in the concentric gap, the second inner coil inner circumference is adjacent the outer circumference of the c-shaped collar, with the c-shaped collar being present within the coil gap defined between the second inner coil outer circumference and the first inner coil inner circumference and the bend back loop being present in the collar gap.

11. The oil pump chain tensioner system of claim 10, further comprising an engine block comprising a protrusion, wherein the second end of the torsion spring is mounted to the protrusion.

12. The oil pump chain tensioner system of claim 10, wherein the boss is perpendicular to the chain tensioning sliding face.

13. The oil pump chain tensioner system of claim 10, wherein the torsion spring is made of flat steel.

14. The oil pump chain tensioner system of claim 10, wherein the torsion spring is made of rounded coil.

15. The oil pump chain tensioner system of claim 10, wherein the second inner c-shaped coil is concentric to the first inner coil and the first inner coil is concentric to the outer coil.

* * * * *